United States Patent [19]

Dohrer

[11] Patent Number: 5,085,927

[45] Date of Patent: Feb. 4, 1992

[54] STRETCH FILM CLING ENHANCEMENT BY ADDITION OF ELASTOMERS

[75] Inventor: Gregory L. Dohrer, Broken Arrow, Okla.

[73] Assignee: Paragon Films, Inc., Broken Arrow, Okla.

[21] Appl. No.: 507,311

[22] Filed: Apr. 10, 1990

[51] Int. Cl.$^5$ .................. B32B 7/02; B32B 27/08; B32B 27/32; B65B 53/00

[52] U.S. Cl. ...................... 428/220; 428/349; 428/516; 428/517; 428/520; 525/240; 53/170; 53/441

[58] Field of Search .............. 428/220, 516, 520, 517, 428/349

[56] References Cited

U.S. PATENT DOCUMENTS

| | | |
|---|---|---|
| 3,547,754 | 12/1970 | Tokos et al. ................... 428/576 |
| 3,932,563 | 1/1976 | Argurie et al. . |
| 4,170,304 | 10/1979 | Huke ................... 206/597 |
| 4,399,180 | 8/1983 | Briggs et al. . |
| 4,418,114 | 11/1983 | Briggs et al. . |
| 4,425,268 | 1/1984 | Cooper . |
| 4,430,457 | 2/1984 | Dobreski . |
| 4,436,788 | 3/1984 | Cooper ................... 428/526 |
| 4,542,188 | 9/1985 | van der Heijden ........... 525/240 |

*Primary Examiner*—P. C. Sluby
*Attorney, Agent, or Firm*—Pravel, Gambrell, Hewitt, Kimball & Krieger

[57] ABSTRACT

An enhancement of the cling property of stretch wrap is obtained by adding a linear styrenic elastomer having a melt index between about 5 and about 10 g/10 mins to the cling layer of a film in addition to the usually added tackifiers. The invention enhanced cling layer films can be produced as A/B, A/B/A OR A/B/C films.

18 Claims, No Drawings

STRETCH FILM CLING ENHANCEMENT BY ADDITION OF ELASTOMERS

FIELD OF THE INVENTION

This invention relates to cling stretch wrap films of high tensile strength having an A/B/A, A/B/C or A/B film structure, wherein the A surface exhibits cling properties, the B layer is primarily responsible for high tensile strength and the C layer, if present, is substantially cling free. In addition, when present, the C layer has a slide property when its surfaces are in contact with relative motion with a second layer of C.

BACKGROUND OF THE INVENTION

Typical "two-sided cling" wrap has an A/B/A structure wherein the A layer provides the cling property and the core B layer provides toughness, support and strength. "Single-sided cling" wraps have either an A/B or an A/B/C structure wherein the A layer provides the cling property, the core B layer provides toughness and strength and the C layer is substantially cling free. These overwrap materials or films are used, among others, in the unitization of pallet loads of individual packages. Ideally, these overwrap materials or films should be of A/B or A/B/C structure, should have high strength, be resistant to tearing and puncturing, and exhibit single-sided cling properties. These single-sided cling properties are necessary to firmly unitize the pallet load while at the same time preventing individual wrapped pallets from clinging to each other with resultant tearing of the film when the pallets are separated from each other.

Several techniques have been developed for achieving cling. These include corona discharge treatment of one side of a film to develop cling on the treated side; laminating or co-extruding at least two films —one having a cling property with the other being non-cling and providing strength; and adding tackifiers to the film composition. Thus, for example, U.S. Pat. Nos. 4,399,180 and 4,418,114 to Briggs et al. relate to a stretch wrap including three layers; a thin skin which imparts cling and gloss properties and a thicker core which provides tear and puncture resistance as well as toughness. The skin layer is a "highly branched" low density polyethylene while the core includes a linear low density polyethylene copolymer with a $C_4$-$C_{10}$ α-olefin.

Some development work has focused on the addition of a tackifier to the skin composition in order to enhance cling properties. For example, U.S. Pat. No. 4,425,268 to Cooper is directed to a film which includes 0.5-6 wt.% of a tackifier, such as low molecular weight polyisobutene, amorphous polypropylene, polyterpene or microcrystalline wax. The film also includes 40-90 wt.% of a high molecular weight ethylene vinyl acetate containing 4-25% vinyl acetate and having a melt index of 0.1-4.0 and 8-55 wt.% of a copolymer of ethylene and an olefin.

U.S. Pat. No. 4,542,188 to van der Heijden relates to a film having one side of higher cling than the other side without using corona discharge treatment. The film includes two polymers and a tackifier. One polymer, comprising 65-80 wt.% of the film, is a crystalline polymer having low or no cling. The other polymer, comprising 20-35 wt.% of the film, is a linear low density copolymer of ethylene and an α-olefin having more than three carbon atoms. The film includes 2-10 wt.% of a tackifier, polybutylene, with a molecular weight of less than 2,000.

U.S. Pat. No. 4,430,457 to Dobreski is directed to a film comprising 90-97.5 wt.% of an ethylene polymer. The ethylene polymer may be selected from the ethylene vinyl acetate copolymers containing 0.3-15 wt.% vinyl acetate, linear low density polyethylene resins and low density polyethylene homopolymers. Further, the film includes 2.5-10 wt.% of an amorphous low molecular weight ethylene propylene copolymer having a ethylene content of between 1 and 7 wt.%. It is further specified that the ratio of ethylene polymer viscosity to ethylene propylene polymer viscosity should be in the range 100 to 100,000.

U.S. Pat. No. 4,170,403 to Huke is directed to a film comprising a blend of polyethylene and 0.5-10 wt.% polyisobutylene. One side of the film is treated with a corona discharge to increase its adhesiveness. Thus, one side of the film has a higher cling property than the other.

U.S. Pat. No. 3,932,563 to Argurio et al is directed to a "self-sealing" film or cling wrap film. The composition of this film includes 90-99.5 wt.% of a copolymer of ethylene and a vinyl ester of a $C_1$-$C_{30}$ monocarboxylic acid. Further, the film composition includes either 0.05-10 wt.% of a hydrocarbon resin or 0.05-5 wt.% polyisobutylene or polybutene. It is further specified that the sum of the weights of the hydrocarbon resin and polyisobutylene or polybutene should be less than 10 wt.%. Finally, the film includes 0.1 to 3.0 wt.% of a partial carboxylic acid of a polyol.

While the above methods of treatment and additives provide some enhancement of the cling property, there yet exists a need for a film with an even greater cling property that can be produced on conventional coextrusion equipment.

SUMMARY OF THE INVENTION

The invention provides a cling stretch wrap film which has superior cling properties while maintaining high tensile strength and elongation. The invention films may be of A/B, A/B/A or A/B/C structure wherein the A layer has the enhanced cling property. Moreover, the films may be readily co-extruded on conventional film forming equipment without the need to modify or customize the equipment.

In order to enhance the cling property of a film, a styrenic elastomer is added to the polymeric composition from which the cling layer is to be extruded. This cling layer, layer A, may then be combined with a core layer B to which A is adherent to form an A/B film. If desired, the A/B film could be further combined with a non-cling layer C or another cling layer A to form a 3 layer A/B/C or A/B/A film. The invention stretch wrap film having enhanced cling properties can, therefore, be prepared as a coextruded A/B, A/B/A or A/B/C film.

The styrenic elastomeric material includes copolymers, terpolymers and block copolymers containing styrene as a repeating unit. The useful styrenic elastomers include those linear styrenic elastomers having a melt index (MI) from about 5 to about 10 that have a styrene content of less than about 30 wt.%

While not wishing to be bound by any theory, it is speculated that the styrenic elastomeric composition enhances the effect of tackifiers added to the resin composition from which the cling layer is extruded. Thus, a tackifier must be present in the composition.

Further, since the enhanced cling property derives from the addition of a styrenic elastomeric composition to layer A, the composition of layers B and C include all those compositions useful in producing a typical A/B/C film. Thus, a tough, tear-resistant film with a substantially non-cling layer C such as that described in our copending U.S. Ser. No. 462,504 filed Jan. 8, 1990 (hereby incorporated by reference as if fully set forth) may be readily modified to enhance the cling property of the layer A by the addition of an elastomeric composition. The resultant film will then incorporate an enhanced cling layer A, a tough, tear-resistant layer B, and a substantially non-cling layer C.

DETAILED DESCRIPTION OF THE PREFERRED EMBODIMENTS

The invention comprises a cling stretch wrap film having enhanced cling on one or both sides. Cling enhancement is achieved by adding a quantity of a styrenic elastomer to the A layer which should also include a tackifier. The enhanced cling properties may therefore be achieved in conventional co-extruded A/B/C, A/B/A or A/B film structures.

Layer A is typically the layer to which the linear styrenic elastomer is added to enhance the cling of the A layer which is adherent to either layer C, in an A/B/C film structure, or layer B, in an A/B structure.

Layer B is bonded through the co-extrusion process to layers A and, if present, layer C. Layer B is characterized by a high tensile strength and is chiefly responsible for providing strength, tear resistance and toughness to the film structure.

In an A/B/C structured film, the cling force of the C surface of the film to the C surface of a like A/B/C film is negligible and ideally is not detectable Further, layer C is characterized by a slide property when it is in contact with a layer of itself with relative motion therebetween. The coefficient of friction of the C surface to the C surface of a second (like) film is between about 0.2 to about 2.0, and most preferably is less than 1.0, as measured by ASTM D1894.

The A layer for use in the present invention is preferably fabricated from a resin possessing an inherent cling property and/or a cling property resulting from the incorporation of a tackifier. Examples of such resin film-forming compositions are polyolefins such as polyethylene, polypropylene, copolymers of ethylene and propylene, and polymers obtained from ethylene and-/or propylene copolymerized with relatively minor amounts of an ethylenically unsaturated monomer such as a mono-olefin, preferably a $C_4$-$C_{12}$ mono-olefin, such as butene-1 and isobutylene, acrylic acid, methacrylic acid, esters of acrylic acids, vinyl acetate, styrene and combinations thereof. Preferred is polyethylene, including high and low molecular weight polyethylene and copolymers thereof.

Particularly preferred for the cling film portion of the stretch wrap film of the present invention are those resin-forming systems which exhibit a fairly high level of cling without the addition of a tackifier such as linear low density polyethylene (LLDPE). LLDPE is defined as having a maximum density ranging from about 0.890 g/cc to about 0.930 g/cc, preferably about 0.917 g/cc. LLDPE, characteristically has a melt flow value (ASTM D 1238 Cond. E) ranging from about 0.3 to about 10.0, preferably about 2.3, and is a copolymer of ethylene with a $C_4$-$C_{10}$ olefin, for example, butene-1; 3-dimethyl-butene-1; 1,3-dimethyl-pentene-1; hexene-1; 4-methyl-penetene-1; 3-methyl-hexene-1; octene-1; or decene-1. The α-olefin is usually between 1 to 20 weight percent of the copolymer. Further, ultra low density polyethylene (ULDPE) is also particularly preferred. ULDPE is defined as having a maximum density ranging from about 0.890 g/cc to about 0.915 g/cc, preferably about 0.92 g/cc and contains a higher percentage of the $C_4$-$C_{10}$ αolefin. Resins not inherently possessing cling properties can nevertheless be used in this invention.

In order to provide the enhancement in the cling property of cling layer A, the invention adds a styrenic elastomer as a cling enhancing composition to those film forming resinous compositions that include a tackifier and that are typically used to prepare layer A. Thus, styrenic elastomers such as styrene butadiene, styrene-butadiene-styrene, styrene-isoprene, styrene-isoprene-styrene, styrene-ethylene-butadiene-styrene, and the like may be added. To produce the cling enhancement effect, it is preferred that the styrenic elastomer be linear (i.e. have minimal branching), have a melt index from about 5 to about 10 g/10 minutes as measured by ASTM D1238 Condition G, and have less than about 30 wt.% styrene content.

An enhancement in the cling property may be obtained by adding from about 5 to about 30 wt.% of the styrene elastomer to the resin, based upon the total weight of the resin, the tackifier and the elastomer in the A layer. However, it is preferred that the elastomer be added in amounts ranging from about 5 to about 20 wt.%, most preferably about 7,5 to 15 wt.%.

The elastomeric cling enhancing composition must be added in addition to tackifiers that by themselves enhance the cling property. Thus, the styrenic elastomer enhances the effect of the tackifier. Consequently, the elastomer may be used with the same quantity of tackifier that ordinarily would have been added in order to provide further enhancement of the cling property. Alternatively, the quantity of tackifier may be reduced so that the combined effect of tackifier and elastomer will produce the same cling property as a greater quantity of tackifier.

Nonlimiting examples of tackifiers include, for example, polybutene and low molecular weight polyisobutylene, preferably with a molecular weight between 200-3000, most preferably 1000-1500. Other suitable tackifiers include polyterpenes, amorphous polypropylene, ethylene vinyl acetate copolymers, microcrystalline wax, alkali metal sulfosuccinates, and mono- and diglycerides of fatty acids, such as glycerol monostearate, glycerol monooleate, sorbitan monolaurate, sorbitan monopalmitate, sorbitan monostearate and sorbitan monooleate. Preferably, the tackifier is polybutene. Most preferably, the polybutene is admixed with LLDPE such that from about 20 weight percent to about 70 weight percent, preferably about 50 weight percent, of the admixture is polybutene.

The tackifier can be present in the A layer in any concentration which will permit the A surface to cling to the C surface of a second A/B/C film of like composition or other surfaces, while in its stretched condition. A preferred concentration can range from about 0.1 to 20% by weight of the A layer, most preferably between 0.25 to 6.0 weight percent.

The improvement in cling force of the A surface of the film structure of this invention incorporating the cling enhancing elastomeric component to the A surface of an A/B/A film (of identical composition) is between about 200 g to about 350 g relative to a film without the elastomeric additive. (Cling force measurements referred to herein are in accordance with ASTM D4649 wherein the surfaces of the films are in a stretched condition.)

The cling force of the A surface to the C surface of a like A/B/C film is between about 20 g to about 70 g.

The B layer, which includes any of the known, useful resins for producing such a layer, generally exhibits a minimum machine directional tensile strength value ranging from about 4,000 psi to about 12,000 psi, preferably about 7,000 psi, as measured by ASTM D882. Suitable as the resin film-forming composition for the B layer for use in this invention are polyolefins such as polyethylene, polypropylene, copolymers of ethylene and/or propylene and a small amount of a $C_4$–$C_{12}$ mono-olefinic monomer such as butene-1 and isobutylene. Especially preferred is LLDPE, as defined herein. The B layer is most preferably chemically distinct from the film-forming resins of layers A and C, i.e. the film-forming resins of layers A and C are not identical to the film-forming resin of layer B. In the most preferred embodiment of the invention, the film is fabricated from three chemically distinct resin film-forming systems.

When the C layer is present, the film-forming component of the C layer imparts to the film structure a non-cling or slip surface. While any thermoplastic film can be employed which will provide a non-cling or slip surface, most preferred are polyolefins. Particularly good results are obtained with polypropylene. As explained more fully in our copending application, U.S. Ser. No. 462,504 which is incorporated by reference, a film-forming resin comprising polypropylene and between 10 to about 50 weight percent high density polyethylene (HDPE) is especially preferred. HDPE has a maximum density greater than or equal to 0.940 g/cc and is a homopolymer of ethylene.

In addition to polypropylene, styrene-butadiene as well as other polyolefins can be employed as the resin film-forming system of the C (skin) layer. Such polyolefins include ultra low density polyethylene (ULDPE), LLDPE, low density polyethylene and copolymers thereof also including medium density polyethylene (MDPE). The materials are defined as having a density ranging from about 0.890 to about 0.980 g/cc and a melt index ranging from about 0.4 to about 20. MDPE is defined as having a minimum density ranging from about 0.925 to about 0.940, preferably about 0.935. ULDPE and MDPE are copolymers of ethylene and at least one of the $C_4$–$C_{10}$ olefins recited above. (It is well recognized in the art that LLDPE, MDPE and ULDPE are copolymers of ethylene and an α-olefin comonomer and that the density of the copolymer decreases as the amount of comonomer increases.) When such polymers are employed, however, it is often necessary to use an antiblock agent in order to obtain an A/C and C/C cling force within the desired limitations as stated herein.

Suitable antiblock agents include those containing silicon such as calcium silicate, silicon dioxide (most preferably 0.5 to 10 wt.% $SiO_2$, in. LLDPE) as well as such crystalline and amorphous silicates as $Na_2O \cdot Al_2O_3 \cdot SiO_2 \cdot 4H_2O$, bentonite, diatomaceous earth, clay and talc. In addition, such organic materials, as starches, preferably those having an average particle size from about 10 to about 200 millimicrons, can be employed.

Such antiblock agents should be evenly distributed and should be added in such quantities as to impart to the film structure as undetectable C/C cling force. Normally, the presence of an antiblock agent in excess of 2.0 weight percent is undesirable since greater amounts initiate tear and/or fracture thereby compromising the tear and puncture resistant properties of the total film structure.

The thermoplastic film structure desirably exhibits a machine directional tensile strength between about 4,000 to about 12,000 psi, as measured by ASTM D 882. In addition, the film structure should have a minimum stretch capability of about 200%, and a maximum stretch capability of about 600%, preferably between 350 and 450%, as measured by ASTM D4649. Such minimum stretch capability is needed due to the continuous stretching of the film roll caused by the braking tension applied to the roll after the film is laid about the girth of the pallet platform during overwrapping.

In the three structured A/B/C embodiment, the film should have an A to B to C weight ratio of from about 5:90:5 to about 30:40:30, most preferably about 0:80:10. The film will have an overall thickness ranging from about 0.3 mil to about 5.0 mil, preferably 0.8 mil. In general, the thickness of the A layer is between about 0.025 to about 0.9 mils. The thickness of the B layer is between about 0.020 to about 2.7 mils and the thickness of the C layer is between about 0.025 to about 0.9 mils.

The enhanced cling stretch wrap films of this invention may be formed by conventional techniques of coextrusion to assemble the composite structure, such as by the simultaneous coextrusion of resin film-forming layers A, B and C. In the 3-layer embodiment, the A layer is preferably between 5 and 15 wt.% of the overall film thickness; the B layer is between 70 and 90% of the overall film thickness; and the C layer is between 5 and 15% of the overall film thickness.

In the coextrusion process for a three layer film, the melt temperature for each extruder is independently selected such that the viscosities of th different film components are matched. Further, the three extruders should be operating simultaneously to produce the coextruded film. Thus, for optimum production the output capacity for each of the three extruders should be close to equivalent. For example, to produce a 10:80:10 (w/w) A/B/C film structure, if the core (center) extruder for layer B is relatively small (5 inch diameter, 24:L:D) then the satellite extruders for layers A and C must be proportionately smaller. If on the other hand the core extruder is relatively large (6 inch diameter, 30/L/D) then the size of the satellite extruders must be increased in order for the film layer ratios to remain relatively constant. In addition, the melt viscosity of all three components must be approximately the same. Generally, the viscosity of the resin forming systems of layers A and C are matched to the viscosity of the resin film-forming system of layer B. Thus, if the viscosity of the resin in the A or C extruder is lower than that of the core layer at any given temperature, then its melt temperature must be reduced to increase its viscosity. If the viscosity of the resin in the A or C extruder is higher than that of the resin film-forming system of the B layer, then its melt temperature must be increased to decrease its viscosity. Since each extruder of the film-forming system B operates at a separate melt temperature, the temperature profile of the zones in each extruder will likewise differ.

It is readily recognized in the art that the production of thicker extrudates either requires an increase in the speed of the extruder or a decrease in the line speed, i.e. the rate at which the extrudate is removed from the dye. Modern extrusion apparatus generally have maximum extruder speeds and minimum line speeds that can complicate the process. Those of skill in the art would know how to operate the process with due regard to the effects of each variable.

Our co-pending application, U.S. Ser. No. 462,504 fully incorporated by reference, teaches the production of films wherein the preferred polypropylene composition of layer C is modified by the addition of 10-50 wt.% HDPE which acts as a processing aid without impairing the properties desired of a C layer.

The following examples are illustrative of the invention and are not intended to limit the scope of the invention as described above and claimed hereafter.

EXAMPLE 1

Laboratory test samples were prepared to demonstrate the enhanced cling effect obtained by adding an elastomer, styrene-ethylene-butadiene-styrene, to a cling film composition that included a tackifier.

The test samples included the following components:

| Component | Composition | Manufacturer |
| --- | --- | --- |
| Dow 2047A | LLDPE, 2.3 M.I., 0.917 g/cc | Dow Chemical Co. |
| Dow 2032 | LLDPE, 2.0 M.I., 0.926 g/cc | Dow Chemical Co. |
| G-1657 | 13% styrene, 87% rubber | Shell Chemical Co. |
| Santech 52 | 52% polybutene in LLDPE | Santech |

Three separate A/B/C films were prepared and their A/A and A/C cling properties were measured according to ASTM D4649. In all three test films, the B and C layers had the same composition, B was Dow 2047A LLDPE and C was Dow 2032 LLDPE. In the control film, film No. 1, the A layer contained a tackifier, Santech 52, but no elastomer. In invention films Nos. 2 and 3, a styrene elastomer, G-1657, was included in the A-layer. The results indicate enhanced A/A and A/C cling as the proportion of elastomer is increased:

| Film | Composition of Layer A | | | Cling force, g | |
| --- | --- | --- | --- | --- | --- |
| | 2047A | Santech 52 | G-1657 | A/A | A/C |
| 1 | 94 | 6 | — | 190 | 120 |
| 2 | 91 | 2 | 7 | 390 | 140 |
| 3 | 79 | 6 | 15 | 520 | 190 |

Further, comparing invention film No. 2 with control film No. 1 indicates that adding the elastomer (G-1657) while decreasing the amount of tackifier (Santech 52) also results in cling enhancement.

EXAMPLE 2

To test the effect of elastomer type on cling, a series of 3-layer A/B/C films were produced, each having a B layer of Dow 2047A LLDPE, a C layer of Dow 2036A, a 0.935 g/cc density LLDPE having a 2.5 MI. In one set of films, the A layer contained, in major proportion Dow 2047A LLDPE, and 2 wt.% of a tackifier, Santech 52, with 7 wt.% of an elastomer. In another set of films, the A layer contained in major proportion Dow 2047A LLDPE, 6 wt.% Santech 52 tackifier and 15 wt.% of an elastomer. The elastomers used were all products of Shell Chemical Co. and may be characterized as follows according to Shell literature:

| Name | Composition | Styrene:Rubber Ratio | MI | Viscosity cp at 77° F. |
| --- | --- | --- | --- | --- |
| D-1101 | linear SBS | 31:69 | <1 | 4000 |
| D-1102 | linear SBS | 28:72 | 6 | 1200 |
| D-1107 | linear SIS | 14:86 | 9 | 1600 |
| D-1112 | linear SIS | 14:86 | 23 | 900 |
| D-1116 | branched SB | 21:79 | —[1] | 9000 |
| D-1300 | linear SBS | 17:83 | — | 6000 |
| D-1320 | branched SI | 10:90 | — | 2500 |
| G-1657 | linear SEBS | 13:87 | 8 | 4200 |

[1] "—" indicates no data.

where
SBS = styrene-butadiene-styrene block copolymer
SIS = styrene-isoprene-styrene block copolymer
SB = styrene-butadiene
SI = styrene-isoprene
SEBS = styrene-ethylene-butadiene-styrene block copolymer The melt index is measured by ASTM D-1238 Condition G and the viscosity is the Brookfield viscosity of a 25 wt.% solution in toluene at 77° F.

Cling tests were carried out on 18 films using ASTM D4649 and the results were:

| Film No. | Composition of Layer A, wt. % | | | Cling force, g | |
| --- | --- | --- | --- | --- | --- |
| | 2047A | Santech 52 | Elastomer/wt. % | A/A | A/C |
| 4 | 91 | 2 | D-1101/7 | 0 | 0 |
| 5 | 79 | 6 | D-1101/15 | 0 | 0 |
| 6 | 91 | 2 | D-1102/7 | 180 | —[1] |
| 7 | 79 | 6 | D-1102/15 | 460 | — |
| 8 | 91 | 2 | D-1107/7 | 340 | — |
| 9 | 79 | 6 | D-1107/15 | >500 | — |
| 10 | 91 | 2 | D-1112/7 | 170 | — |
| 11 | 79 | 6 | D-1112/15 | >500 | — |
| 12 | 91 | 2 | D-1116/7 | 0 | — |
| 13 | 79 | 6 | D-1116/15 | 0 | — |
| 14 | 91 | 2 | D-1300/7 | 0 | — |
| 15 | 79 | 6 | D-1300/15 | 0 | — |
| 16 | 91 | 2 | D-1320/7 | 0 | — |
| 17 | 79 | 6 | D-1320/15 | 0 | — |
| 18 | 91 | 2 | G-1657/7 | 440 | 270 |
| 19 | 87 | 6 | G-1657/7 | >500 | 430 |
| 20 | 83 | 2 | G-1657/15 | 475 | 300 |
| 21 | 79 | 6 | G-1657/15 | >500 | 470 |

[1] "—" indicates no data.

From the foregoing test results, it can be seen that branched styrene copolymers, such as D1116 and D1320, do not provide useful cling levels. Further, those elastomeric styrenic copolymers that have a melt flow outside the range from about 5 to about 10 g/10 mins, as measured by ASTM pb 1238 condition G, are not useful in providing cling enhancement. Finally, when the styrene proportion of the elastomer is greater than about 30 wt.%, the elastomer is not useful in cling enhancement. Thus, it is preferred that the elastomer be linear, have an MI between about 5 and 10, and have a styrene content less than about 30 wt.%.

The invention has been described with reference to its preferred embodiments. Upon reading the above disclosure, a person of ordinary skill in the art may appreciate modifications that are within the scope and spirit of the disclosure and the claims below.

What is claimed is:

1. A stretch wrap film comprising layers A and B wherein layer A has a cling force to another layer A of at least about 150g, measured according to ASTM D4649, and wherein layer A comprises at least one linear styrenic elastomer and a tackifier, said linear styrenic elastomer having a melt index as measured by ASTM 1238 Condition G of from about 5 to about 10g.10 mins and containing less than about 30 wt.% styrene; and said B layer is comprised of a polyolefin.

2. The stretch wrap film of claim 1 wherein the at least one elastomer comprises styrene butadiene, styrene-isoprene, styrene-butadiene-styrene, styrene-ethylene-butadiene-styrene or styrene-isoprene-styrene.

3. The stretch wrap film of claim 1 wherein layer A comprises from about 5 to about 30 wt.% of the elastomer.

4. The stretch wrap film of claim 1, further comprising a C layer to from an A/B/C film structure wherein the coefficient of friction of the C surface of said film to another C surface is less than 2.0.

5. The stretch wrap film of claim 4, wherein said coefficient of friction is less than 1.0.

6. The stretch wrap film of claim 1, wherein the B layer has a tensile strength between about 4,000 to about 12,000 psi.

7. The stretch wrap film of claim 4, wherein the A:B:C weight ratio is between from about 5:90:5 to about 30:40:30.

8. The stretch wrap film of claim 7, wherein the A:B:C ratio is approximately 10:80:10.

9. The stretch wrap film of claim 1, wherein said B layer is fabricated from a polyolefin selected from the group consisting of polyethylene, polypropylene and a copolymer of ethylene, propylene and a $C_4$–$C_{12}$ monoolefin.

10. The stretch wrap film of claim 9, wherein said polyolefin is linear low density polyethylene.

11. The stretch wrap film of claim 4, wherein said C layer comprises polypropylene and high density polyethylene.

12. The stretch wrap film of claim 4, wherein the C layer further comprises an anti-block agent in an amount sufficient to produce a cling force of approximately zero.

13. The stretch wrap film of claim 11, wherein said layer C comprises approximately 30 weight percent high density polyethylene.

14. The stretch wrap film of claim 1 further comprising an additional layer A to form an A/B/A film structure and wherein at least one of the layers A comprises at least one elastomers.

15. The stretch wrap film of claim 14 wherein the at least one elastomer comprises styrene butadiene, styrene-isoprene, styrene-butadiene-styrene, styrene-ethylene-butadiene-styrene or styrene-isoprene-styrene.

16. The stretch wrap film of claim 14 wherein the elastomer comprises from about 5 to about 30 wt.% of layer A.

17. The stretch wrap film of claim 14 wherein the cling force of layer A to a like surface A is 150 to 600 g, as measured according to ASTM D4649.

18. The stretch wrap film of claim 14 wherein the B layer has a tensile strength from about 40,000 psi to about 12,000 psi.

* * * * *